(12) United States Patent
Shafer et al.

(10) Patent No.: US 9,262,525 B2
(45) Date of Patent: Feb. 16, 2016

(54) CUSTOMIZED SEARCH

(75) Inventors: John C. Shafer, Los Altos, CA (US);
Rakesh Agrawal, San Jose, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1501 days.

(21) Appl. No.: 12/253,658

(22) Filed: Oct. 17, 2008

(65) Prior Publication Data

US 2010/0114925 A1 May 6, 2010

(51) Int. Cl.
*G06F 17/30* (2006.01)

(52) U.S. Cl.
CPC ............................. *G06F 17/30864* (2013.01)

(58) Field of Classification Search
CPC ............................................... G06F 17/30864
USPC ........................................ 707/722, 706, 769
See application file for complete search history.

(56) References Cited

U.S. PATENT DOCUMENTS

| | | | |
|---|---|---|---|
| 6,721,736 B1 | 4/2004 | Krug | |
| 7,386,572 B2 | 6/2008 | Kramer | |
| 7,707,039 B2 | 4/2010 | King et al. | |
| 7,742,953 B2 | 6/2010 | King et al. | |
| 7,801,876 B1 * | 9/2010 | Riley | G06F 17/30864 707/706 |
| 7,809,709 B1 * | 10/2010 | Harrison, Jr. | G06F 17/30867 707/603 |
| 7,987,185 B1 * | 7/2011 | Mysen | G06F 17/30864 707/733 |
| 8,150,828 B2 * | 4/2012 | Prabhu | G06F 17/30867 707/706 |
| 8,510,330 B2 * | 8/2013 | Brice | G06F 17/30306 707/713 |
| 8,725,716 B1 * | 5/2014 | Riley | G06F 17/30702 707/707 |
| 8,805,822 B2 * | 8/2014 | Jaffer | G06Q 10/06 707/722 |
| 2004/0260695 A1 * | 12/2004 | Brill | G06F 17/30867 707/707 |
| 2005/0160083 A1 | 7/2005 | Robinson | |
| 2006/0026147 A1 * | 2/2006 | Cone | G06F 17/30867 707/707 |
| 2006/0047639 A1 * | 3/2006 | King | G06F 17/218 707/707 |
| 2006/0248059 A1 | 11/2006 | Chi | |
| 2007/0061486 A1 | 3/2007 | Trinh | |
| 2007/0250492 A1 * | 10/2007 | Angel | G06F 17/3097 707/707 |
| 2008/0140626 A1 * | 6/2008 | Wilson | G06F 17/30864 707/707 |
| 2011/0019020 A1 | 1/2011 | King et al. | |
| 2011/0029504 A1 * | 2/2011 | King | G06F 17/3089 707/709 |

OTHER PUBLICATIONS

Bernard Farrell ("Creating Google Custom Search Engines," Published at http://www.onlamp.com/lpt/a/7107 on Sep. 6, 2007, pp. 1-6).*
Aaron Trevena, Adding Search Functionality to Perl Applications, Sep. 25, 2003, Copyright 2008 O'Reilly Media, Inc, http://www.perl.com/pub/a/2003/09/25/searching.html.
Searchgeek, Convera(R) Powers Publishers to manage and Refine Vertical Search Engines, Feb. 20, 2007, http://theonlinemarketing-guy.com/converar-powers-publishers-to-manage-and-refine-verticle-search-enginges/.
Google Custom Search Platform Now Supports 40 Languages, Nov. 29, 2007, The Internet Retailer, http://www.internetretailer.com/dailyNews.asp?id=24580.
Kristen Nicole, Yahoo Search Monkey Reveals More Details on Developer Platform, Mar. 13, 2008, Mashable Social Networking News, http://mashable.com/2008/03/13/yahoo-search-monkey/.

* cited by examiner

*Primary Examiner* — Robert Beausoliel, Jr.
*Assistant Examiner* — Alexandria Bromell
(74) *Attorney, Agent, or Firm* — Steve Wight; Judy Yee; Micky Minhas

(57) ABSTRACT

Techniques are disclosed herein for providing a custom search engine. In one aspect, a first search query is received from a requestor. First search results contain search result items that match the first search query are obtained. A least one sub-query is generated from the first search results. The generating is based on rules for a particular custom search engine. Second search results that match the sub-query are then obtained. A search result set is formed from a corpus that includes the first search results and the second search results. The generating of the search result set is based on the rules for the particular custom search engine. The search result set is provided to the requester. In one aspect an interface for designing a custom search engine is provided. The interface allows the designer to specify the layout of a search results page.

15 Claims, 16 Drawing Sheets

Content Details

Name           Video Games

Description    [My video game wishlist] ~ 702

Root or
Feed URL       [                    ] ~ 704

Upload File    [          ] (Browse)
                  ↘706

Inline         [                    ] ~ 708

(Save)  (Discard)

Search Engine Configuration Details

Name      Video Games

Description   [ My video game custom search engine ] ~703

Content   [ GAMES ▼ ] ~760 (754)

URLs   [ Gamespot.com / Ign.com / Teambox.com ] ~756

(Suggest URLs) ~762

Query Terms   [ ] ~758

Advertising   ☐ ~760

(Save)  (Discard)

Search Engine Designer

Configure Custom Content

Configuration | Layout

Configure the Internet Search item by selecting or entering values in the fields below. Mouse over the field labels for more information. Required fields are specified by asteisk.

Number of Results* | 10 — 822

Query Augmentation | — 824

Content | Games ▼ — 760
              826

CUSTOMIZED SEARCH

BACKGROUND

Through the use of the Internet, individuals have access to millions of pages of information. However a significant drawback with using the Internet is that because there is so little organization to the Internet, at times it can be extremely difficult for users to locate the particular "web pages" that contain the information that is of interest to them.

To address this problem, "search engines" index a large number of web pages and provide an interface that can be used to search the indexed information by entering certain words or phases to be queried. Indexes are conceptually similar to the normal indexes that are typically found at the end of a book, in that both kinds of indexes comprise an ordered list of information accompanied with the location of the information.

Although there are many popular Internet search engines, they are generally constructed using the same three common parts. First, each search engine has at least one "spider" that "crawls" across the Internet to locate web pages around the world. Upon locating a web page, the spider stores the web page's Uniform Resource Locator (URL), and follows any hyperlinks associated with the web page to locate other web pages. Second, each search engine contains an indexing mechanism that indexes certain information about the web pages that were located by the spider. The indexing mechanism stores the index information in large databases that can typically hold an enormous amount of information. Third, each search engine provides a search tool that allows users to search the databases in order to locate specific web pages that contain information that is of interest to them.

The search engine provides an interface that allows users to specify their search criteria and, after performing a search, an interface for displaying the search results. Typically, the search engine orders the search results prior to presenting the search results interface to the user. The order usually takes the form of a "ranking", where the web page with the highest ranking is the web page considered most likely to satisfy the interest reflected in the search criteria specified by the user. The specific techniques for determining that ranking will vary from implementation to implementation.

Once the matching web pages have been determined, and the display order of those web pages has been determined, the search engine sends to the user that issued the search a "search results page" that presents information about the matching web pages in the selected display order. Significantly, the search results page does not present to users the matching web pages themselves, but merely data that identifies the matching web pages. Typically, the number of web pages that match a search is so large that the user is presented with a search results page that only displays information about the top N ranking web pages, where N may be significantly smaller than the total number of matching web pages. The search results page typically includes a control that allows the user to retrieve information about the "next N" matching documents, in the event the first N matching web pages do not entirely satisfy the user's interest.

Attempting to augment the search experience that a search engine can provide requires significant development skill and substantial resources, which can provide barriers. For example, a small company that has a web site might want to add some search capability to their web site. Ideally, the search would involve the proprietary content of the company (e.g., inventory data), as well as content not owned by the company (e.g., web content). However, the while the small company has relevant proprietary content and domain expertise for a particular topic, the small company does not have the capability to build the search experience. Moreover, the small company would prefer not to incur the cost of hiring a consultant to build the search experience.

SUMMARY

Techniques are disclosed herein to make use of the infrastructure of existing search engines to support other search experiences rather than just the search engine's singular search experience. By creating a platform around these infrastructures, non-developers can feed in their proprietary content and create a custom search engine around their proprietary content that also leverages services within the search platform to provide news, web content, related queries, etc. Because the proprietary content may be structured, the platform supports querying structured data. The content is kept proprietary and is not surfaced anywhere else but in the owner's custom search engine (unless authorized by the owner). The designer of the custom search engine has full control over the layout of the search results page, how search result links are displayed, how structured results are shown, and where advertisements (if any) are placed.

In one implementation, information is received from a requester. Content that contain items is determined based on the information. A least one sub-query is generated from the content. The generating is based on rules for a particular custom search engine. Search results that match the at least one sub-query are then obtained. A search result set is formed from the items in the content and the search results. The generating of the search result set is based on the rules for the particular custom search engine. The search result set is then provided to the requestor.

In one implementation, the information from the requester is a search query. In one implementation, the information pertains to the requestor in some manner. For example, the information may identify the requestor, the requestor's location, etc. The information from the requester may include both a search query and information that pertains to the requestor.

Another aspect is a method for providing an interface for a designer to design a custom search engine. In this aspect, an interface for a designer to design a custom search engine is provided. The following information is received in the interface: a) either first content to be searched or identification of first content to be searched by the custom search engine; b) information that specifies how to construct a sub-query from first search results that are returned when the first content is searched by the custom search engine; c) either second content to be searched or identification of second content to be searched using the sub-query, second search results are returned when the second content is searched using the sub-query; and d) information that specifies how to generate final search results from the first search results and the second search results. The information that is received in the interface is stored, and the stored information is associated with the custom search engine.

Another aspect is a system comprising a processor and a computer storage medium coupled to the processor. The computer storage medium has instructions, which when executed on the processor implement a method comprising the following. A first search query is received from a requestor. Metadata that identifies a particular custom search engine is received from the requestor. Stored configuration information for the particular custom search engine that is identified by the metadata is accessed. Based on the configuration information, a first corpus to search is determined. The first corpus is searched using the first search query to obtain first search results that match the first search query. One or more sub-queries are generated from search results items in the first search results. The one or more sub-queries are generated based on the configuration information. Based on the configuration information, a second corpus to search is determined. The second corpus is searched using the at least one sub-query to obtain second search results that match the one or more sub-queries. A search result set is generated from a corpus that includes the first search results and the second search results. Generating the search result set is based on the configuration information. The search result set is provided to the requester.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIG. 7A is one embodiment of a configuration tool that allows the designer to upload or register their content with a server.

FIG. 7B is one embodiment of a configuration tool that allows the designer to provide configuration information for a custom search engine.

FIG. 8B shows one embodiment of a configuration tool to customize content to be searched.

DETAILED DESCRIPTION

Figure 1:
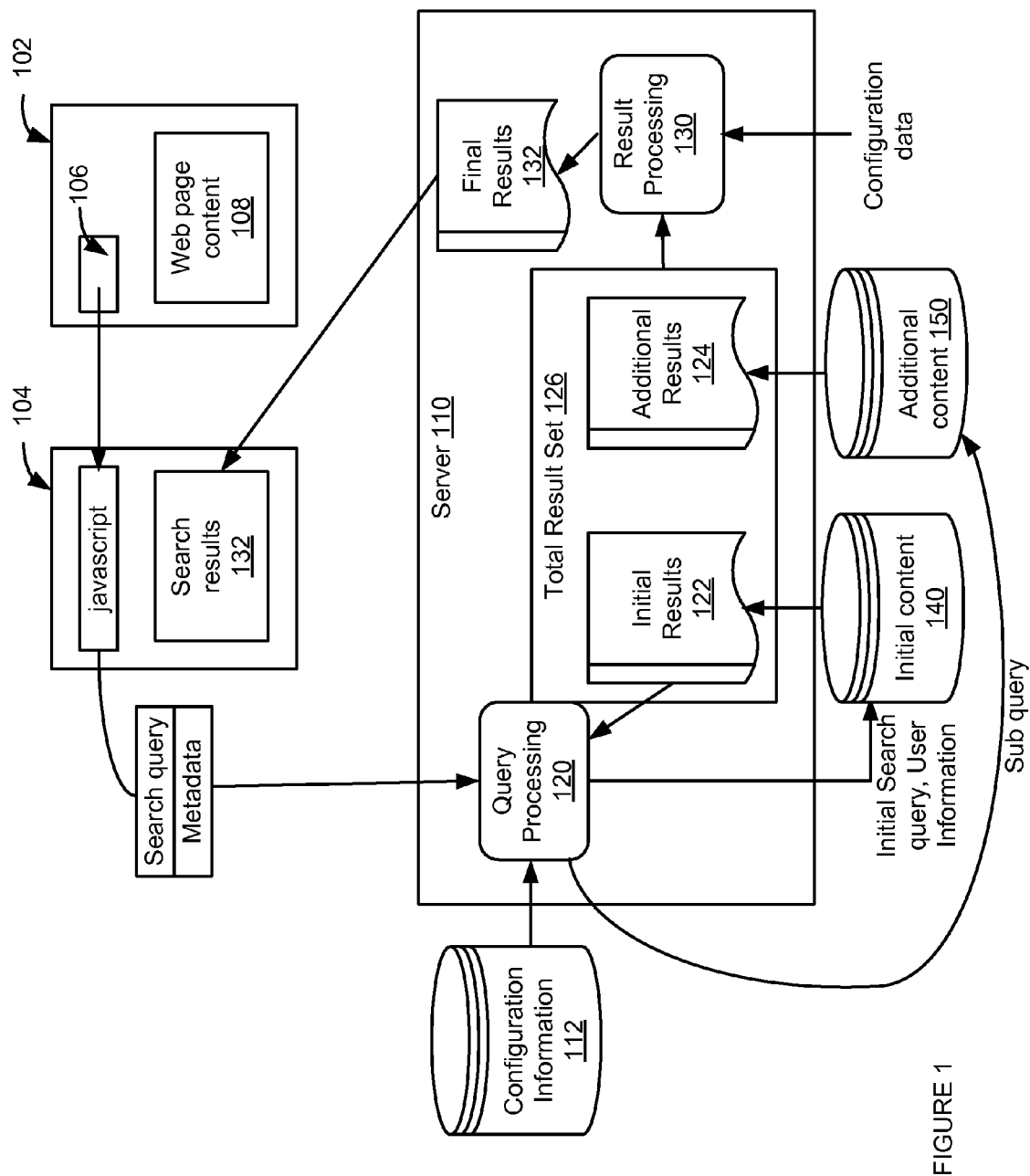
FIG. 1 illustrates an overview of one embodiment of a system for providing a custom search engine.

FIG. 1 illustrates an overview of one embodiment of a system for providing a custom search engine. The system allows designers to build a custom search engine that combines their own proprietary data such as electronic files that describe a store's inventory with third party information such as product reviews. The designer is allowed to define what information from their content and what third party information should appear on the search results page. Moreover, the designer is allowed to specify how the information should be arranged on the search results page.

The following examples will illustrate how the system can be used to create a custom search engine. A shoe store owner has a web site that customers visit to learn what shoes and related merchandise the store has for sale. However, the web site is somewhat limited in scope due to the time, cost, and expertise required to construct web sites. The shoe store has a database describing the inventory of shoes and related items for sale. This database stores the information in a structured, or at least, semi-structured manner. For example, the database entries have fields for item description, sizes available, price, etc.

The shoe store owner may desire that the web site augments the limited information available on the web site with product reviews, tips on shoe selection, trail guides, etc. Such information may be readily available on the Internet or another source. Moreover, the store owner desires that customers have an easy way to search for shoe related information while the customer is on the shoe store's web site. However, the shoe store may not have any expertise in constructing web sites and may wish to avoid the expense of hiring a consultant to expand the web site. Thus, although there is readily available third party information that might be used to enhance the customers' experience when visiting the shoe store web site, linking the third party information with the shoe inventory information presents problems. The system of FIG. 1 allows the shoe store to easily link the third party information with the shoe inventory data. Specifically, the system allows the shoe store to create a custom search engine in which a customer can enter a search query on the shoe store web site and obtain search results that are a combination of the shoe store inventory and other information such as product reviews, tips on buying shoes etc.

As another example, a video rental/sale store owner has structured content such as movie titles, ratings (e.g., G, PG, R, etc.), genre, plot descriptions, rental price, sale price, etc. As with the shoe store example, this information is in electronic form such as files or a database. The video store owner does not have, but knows where to locate, other information such as in-depth movie reviews, movie trailers, movie posters, and discussion forums on movie related topics. The system allows the video store to leverage the store's structured content with the other information by allowing for creation of a custom search engine. In this example, when a customer enters a search query for a movie on the video store web site, the custom search engine returns a search results page in which each entry lists the information from the store's content with a review from a third party web site, a poster or trailer, and several URLs that link to discussions about the movie.

As still another example, a private individual who is a wine enthusiast wishes to share the designer's enthusiasm for certain wines. The designer has a list of their favorite wines. However, this designer does not have a web site. In this example, the designer might wish to add a custom wine search engine to a publicly available web site. Thus, others can use the custom wine search engine. This custom search engine might function as follows. If the search "cabernet" is entered, the wine list is searched for cabernets to produce initial search results. Then, certain web sites (specified by the wine enthusiast and configured into the custom search engine) are searched for reviews of each of the cabernets. The final search results contain a link to reviews for each of the cabernets.

Note that it is not required that the custom search is kicked off with an initial search based on a search query. For example, the experience can start by determining some set of initial content (rather than search results) based on information that it is pertinent to a user. The information could be a user ID, e-mail address, etc. As a specific example, when John Smith logs in he is identified and a list of stocks is obtained from proprietary content associated with John Smith. Then, one or more searches are performed to obtain search results for one or more of the stocks on the list. For example, the latest reviews of each stock from a particular analyst are obtained, the latest stock prices are obtained, news for each stocked is searched for, etc.

Further note that the above examples illustrate possible uses of the system. However, as will be clear from the discussion herein, the system allows for many other types of custom search engines. As the example of the wine enthusiast illustrates, the system is not limited to retail applications. Further, while the above examples are of the custom search engine designer providing their own content to be searched (and augmented with another search), there is no requirement that the designer provide their own content to be searched by the custom search engine.

FIG. 1 depicts a web page 102 having a search box 106 that serves as an entry point to a custom search engine. Web page 102 is, for example, a web page on a web site for an online shoe retailer. The web page content 108 could be any content on the web site. In one embodiment, the server 110 provides code (e.g., an HTML snippet) to a custom search engine designer when the designer sets up the custom search engine. The designer may insert the code in a suitable location on the web page 102. Thus, the designer is not required to know how to write HTML code in order to establish a starting point for the custom search engine. Providing code to the designer is not a requirement. Note that it is not required that the entry point to the custom search engine be the search box 106. In other words, it is not required that a search query is submitted at the entry point. In one implementation, some user information such as a user ID, e-mail address, name, location, etc. is submitted at the entry point. In some implementations, both a search query and user information is submitted.

FIG. 1 also depicts a search results page 104 that is specially adapted for the custom search engine. The search results page 104 has embedded JavaScript that automatically forwards a search query that is entered into search box 106 on to the server 110 along with metadata that identifies the custom search engine. The metadata may also contain information that pertains to the user that submitted the search query, as discussed above. As also discussed above, it is not a requirement that a search query be submitted. In one embodiment, the server 110 provides the JavaScript to the designer when the designer establishes the custom search engine. The designer inserts the JavaScript into an appropriate location on the results page 104. The JavaScript also inserts the search results 132 into the proper place on the search results page 104. Thus, the designer is not required to know how to write JavaScript or another coding language.

Both the web page 102 and the search results page 104 may be rendered on a client, which is a computer software application that executes on a computing platform, such as a desktop or laptop computer, to communicate with a server computer software application. The client facilitates a process in which an end user, such as a person requesting a search for information, communicates with the web site that offers the custom search engine (e.g., shoe retailer). The client may be a conventional web browser that facilitates communication over a network, such as the Internet.

In one implementation, the custom search engine performs a first search of initial content 140 with the search query entered in search box 106. The custom search engine may also use the user information to help perform the search. In one implementation, the custom search engine determines initial content based on user information without performing a search based on a search query. For example, a list of Jim Smith's stocks is returned.

In one aspect, the initial content 140 is content provided by the custom search engine designer (herein "designer content"). As examples, the designer content may be the shoe inventory of web site that market shoes, movies and video games for sale or rent by an online retailer, or a wine list supplied by a wine enthusiast. In one embodiment, the server 110 provides an interface for the designer to supply the designer content when setting up the custom search engine. The designer content may be structured, or at least semi-structured. For example, the designer content may have certain fields such as a title field, a price field, etc. Note that the designer content is specific to the custom search engine in this example.

The server 110 has access to additional content 150. In some embodiments, the additional content 150 is searched to augment the results of searching the initial content 140. The additional content 150 is not limited to any particular content. For example, the additional content 150 might be any content available through an Internet search, or it could be limited to specific URLs (which may or may not be available in a typical Internet search). In some embodiments, the additional content is a specific "service" provided by a search engine. For example, some search engines have different services that search for news, images, sports, etc.

The server 110 has access to configuration data 112 that defines how search queries should be processed and how search results should be constructed by each custom search engine. The metadata sent by the JavaScript is used to identify what configuration information to use for the custom search engine. The configuration data for a particular custom search engine is based on information provided by the designer during the process of setting up the custom search engine.

In one aspect, the configuration information defines what initial content 140 should be searched using the initial query. The initial results 122 are what are generated from the processing of the initial query, the user information, or both. For example, initial search results may be returned from the initial search query with or without basing the search on user information. Note that the initial results 122 may be based entirely on user information. In one implementation, the initial search query is used to search designer content that is provided when the custom search engine was established. However, the initial search can be of any content. Thus, it is not a requirement that the initial results 122 are generated from searching designer content.

The query processing module 120 is able to form sub-queries from the initial results 122 using rules in the configuration information for the custom search engine. The query processing module 120 also determines what content (or corpus) should be searched using the sub-queries. This determination is made based on the configuration information for the particular custom search engine. The additional search results 124 are the results from executing the sub-queries. Together the initial results 122 and the additional results 124 form a total result set 126.

The result processing module 130 generates final results 132 from the total result set 126. The result processing module 130 inputs the configuration information for the custom search engine to determine how to generate the final results 132 for the particular custom search engine.

Figure 2:
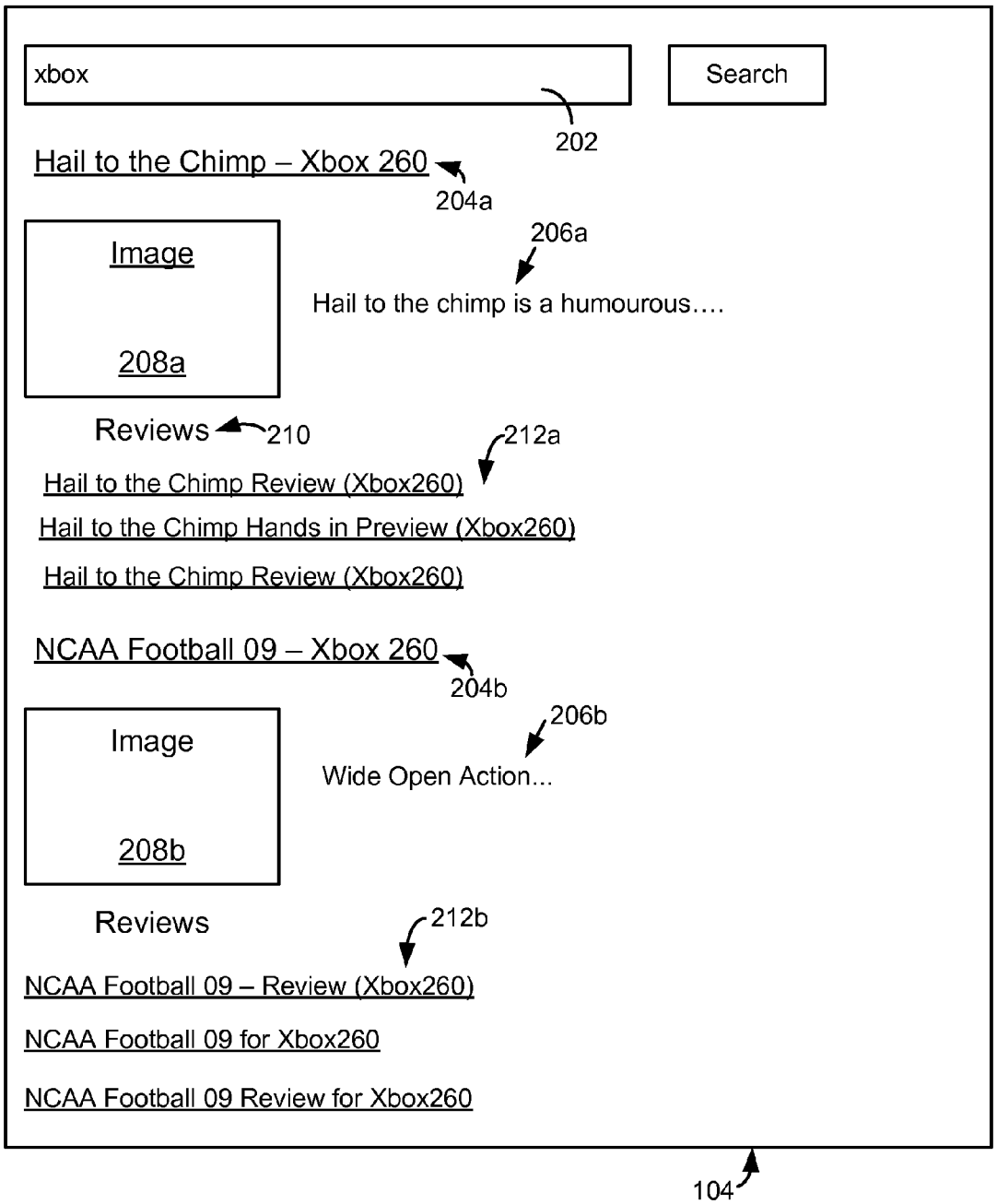
FIG. 2 depicts one embodiment of a search results page.

FIG. 2 depicts one embodiment of a portion of a search result page 104. The results are for a search "xbox" that was entered into the search box 106. This search query is re-displayed in the search box 202 of the search results page 104. In this example, the final search results are a combination of the initial results 122 and additional search results 124. The final search results are organized in a repeating pattern of a title of a movie or video game 204, a description of the movie/video game 206, an image 208, the word "reviews" 210, and links to reviews 212. The title 204, description 206, and image 208 are taken from the initial results 122. The links to reviews 212 are taken from the additional search results 124.

The title 204 may be taken from a title field of structured designer content, the description 206 from a description field, and the image 208 from an image in the designer content. Note that it is not required that the initial results 122 be structured results. In this example, the initial results 122 were derived from searching designer content for an online movie/video game retailer. Result items 204a, 206a, and 208a are derived from a record in the designer content for the video game "Hail to the Chimp". The data used to create the "Hail to the Chimp—Xbox 360" hyperlink 204a, the thumbnail image 208a, and the game description 206a all come from corresponding fields in that record.

In this example, the corpus that was searched to produce the additional search results 124 was three web sites that are specified when the custom search engine was established. Note that the search against this additional content 150 was driven not by the original "xbox" query, but rather by the name field from the "Hail to the Chimp" record. Similarly, for the next result item, the search query used to search the additional content 150 to generate review links 212b is derived from the title "NCAA Football 09—Xbox 360" 204b (which is based on a title field for the corresponding record in the designer content). This shows one example of search results that are a combination of designer structured content uploaded to the server 110 by the designer and web content obtained on-the-fly.

Figure 3:
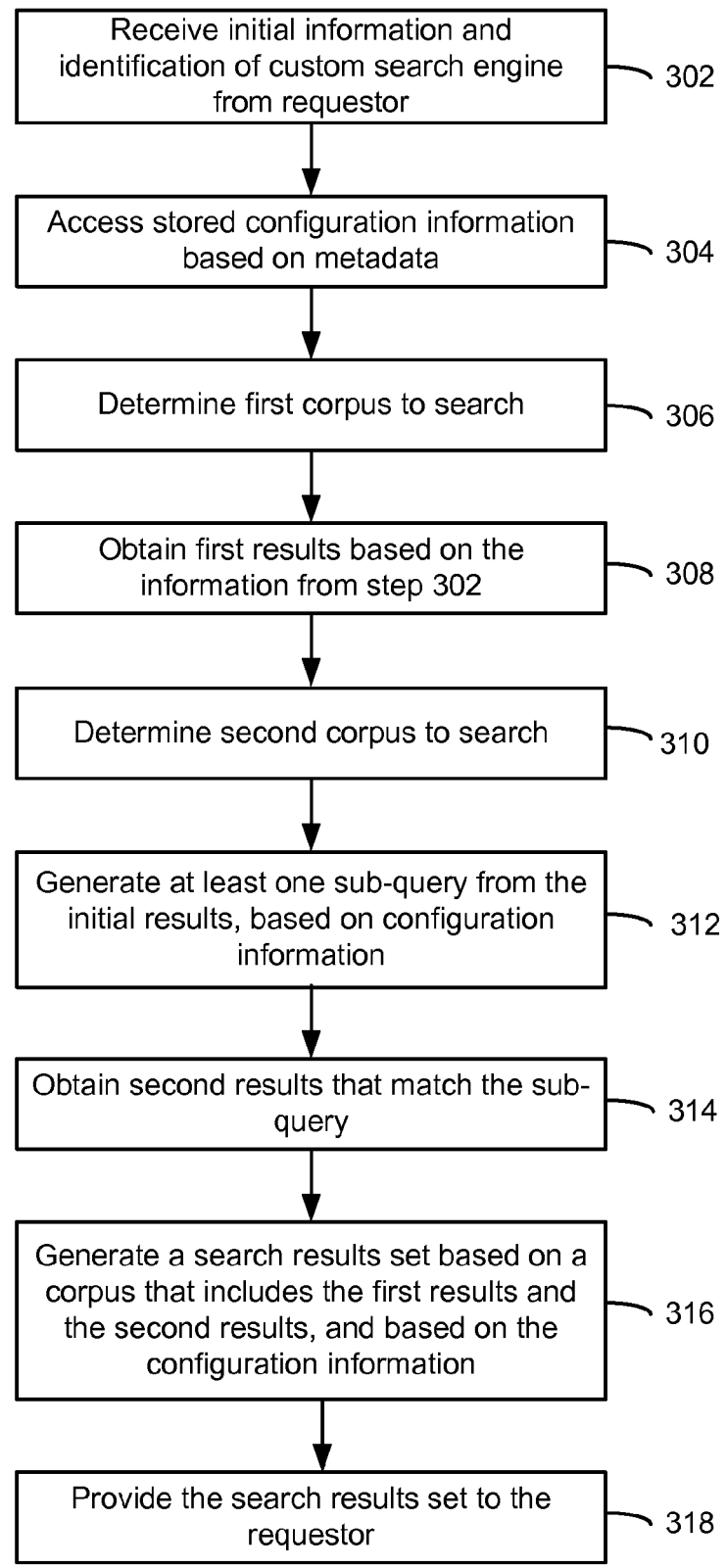
FIG. 3 is one embodiment of a process of providing a custom search engine.

FIG. 3 is one embodiment of a process 300 of providing a custom search engine. Process 300 may be implemented by executing instructions, which are stored on a computer storage medium, on a processor. In one embodiment, the server 110 performs process 300. Process 300 will be discussed with reference to the system of FIG. 1; however, process 300 is not limited to the system of FIG. 1. Process 300 will be discussed using an example in which the custom search engine is for a web site that sells movies, video games, and the like. Process 300 will also be discussed with reference to FIG. 2, which depicts an example results page 104.

In step 302, the server 110 receives initial information and metadata identifying the custom search engine. The initial information may include an initial search query and/or user information. In the present example, the user enters the query "xbox" in the search box 106 on the web site of the online movie and video game retailer. This causes a framework for the search results page 104 to be loaded on the client of the user. The framework for the search results page 104 has embedded JavaScript that sends the initial search query to the server 110, along with metadata that identifies the particular custom search engine. As previously indicated, the metadata may also include user information. The metadata is used to identify the correct configuration information for the custom search engine. In step 304, stored configuration information for the custom search engine is accessed based on the metadata.

In step 306, a determination is made as to what content to search for the custom search engine identified by the metadata. In one embodiment, the query processing module 120 identifies what portion of the designer content to search based on the configuration data. In the present example, the designer content provided by the movie/video game retailer is identified in the configuration data. However, the initial content to be searched is not limited to designer content. For example, the initial content to be searched could be the entire web, specified URLs, or services (e.g., news, weather, sports, finances). Note that any combination of these example sources can be searched.

In step 308, first results are produced based on the information from step 302. For example, the content identified in step 304 is searched to produce initial results 122 that match the initial search query. As another example, a list of a particular user's stocks is produced based on user information. Referring to FIG. 1, in one implementation, the query processing module 120 uses the initial search query to search specifically identified portions of the initial content. A set of initial results 122 are generated as a result of the search. In some embodiments, the initial results 122 are formed from a search of structured content, and hence reflect that structure themselves. For example, FIG. 2 shows final search results that are formed from structured content. Note that the first results 122 might be sub-divided into different categories based on what content was searched. For example, there could be a category of results based on searching weather and another category of results based on searching news, etc.

In step 310, a determination is made as to what content to search using the sub-queries. This determination is made based on rules in the configuration information for the custom search engine. As an example, the designer that created the custom search engine identifies one or more URLs of web sites that provide movie and or video game reviews to be searched. In this example, the URLs are known to the designer, but not owned by the designer. However, the content to be searched could be content provided by the designer. As previously discussed, there is no limit to what might be searched with the sub-queries. In some cases, the designer content might be searched with the sub-queries. Note that the content could include many different sources, such as a news source, a travel package source, etc.

In step 312, one or more sub-queries are generated from the initial results 122. Each sub-query is generated based on rules in the configuration information. As an example, the rules indicate that the sub-query should take the title from the title field of each search result item in the initial results 122 and add on the word "review." For example, for the search result item "hail to the chimp—Xbox 360", the search "hail to the chimp—Xbox 360 review" is formed. Some terms could be removed from the search result item to form the sub-query. For example, "Xbox 360" might be removed. In some cases, the sub-query is formed exactly from the search result item.

Note that in this example, the initial results 122 are based on searching structured content, and thus it is known that a movie or video game title is being extracted from the title field. However, as previously indicated it is not an absolute requirement that the content that is searched be structured. Therefore, it might not be known whether the data in the fields of the search result items are titles or something else.

As previously discussed, the initial results can split into different categories. For example, for a travel search engine, the content that was searched could be travel packages and a news service. Thus, the initial results 122 would contain a travel packages search results and news search results (in this example each based on the initial query). Sub-queries can then be formed from the travel package search results to query "second-level" content in order to show the weather for the location of each travel package as well as web results for recommended restaurants. The content sources for weather and restaurants may be entirely different, and may also use different fields from the travel-package results to create their sub-query. However, it may be that no sub-queries are formed from the news results. Thus, note that 0, 1, or many types of sub-queries can be formed for each type of search result.

The actual number of sub-queries that are formed can be limited to avoid having to perform too many searches. For example, the configuration information can specify that the initial results 122 should only contain 10 items. Therefore, in the present example the initial results 122 would have 10 items, each with a title of a movie or video game (and associated description and image). Thus, 10 different sub-queries would be formed to search for reviews for 10 different movies (or video games).

In step 314, the content identified in step 310 is searched to produce additional search results 124 that match the sub-queries. As an example, for each video game title in the initial results, the additional search results contain links to specific web pages that review that video game. FIG. 2 depicts several links 212 below the word "review." The three links 212*a* are taken from one or more sub-queries based on the title field, "Hail to the Chimp."

In step 316, final search results 132 are generated. The final search results 132 are based on the combined initial results 122 and the additional search results 124. In the example of FIG. 2, the final results contain results from both the initial results 122 and the additional search results 124. However, note that the final search results 132 might contain only the initial results 122, only the additional search results 124, or a combination of both. As one example, the additional search results 124 might be used to determine which initial results 122 should be included in the final search results 132. For example, first a search of movie reviews is performed. The query might be an actor's name. Then, a search of the online retailer's movie inventory is made using sub-queries that are based on movie titles in the movie reviews. Only reviews for movies that are in stock are shown in the final search results 132. Note that this not only illustrates that the additional search results 124 do not need to be displayed in the final search results 132 (although they are used to determined what is displayed in this example), but this also illustrates that the second content to be searched could be designer content.

In step 318, the final search results 132 are provided to the requester. For example, HTML representing the final search results 132 is sent back to the user's browser. The HTML is received by the JavaScript, which injects it into the results page 104. Details of how a designer can configure the results page layout are discussed below. To the user, the results appear as though they came seamlessly from the owner's web-site.

Figure 4:
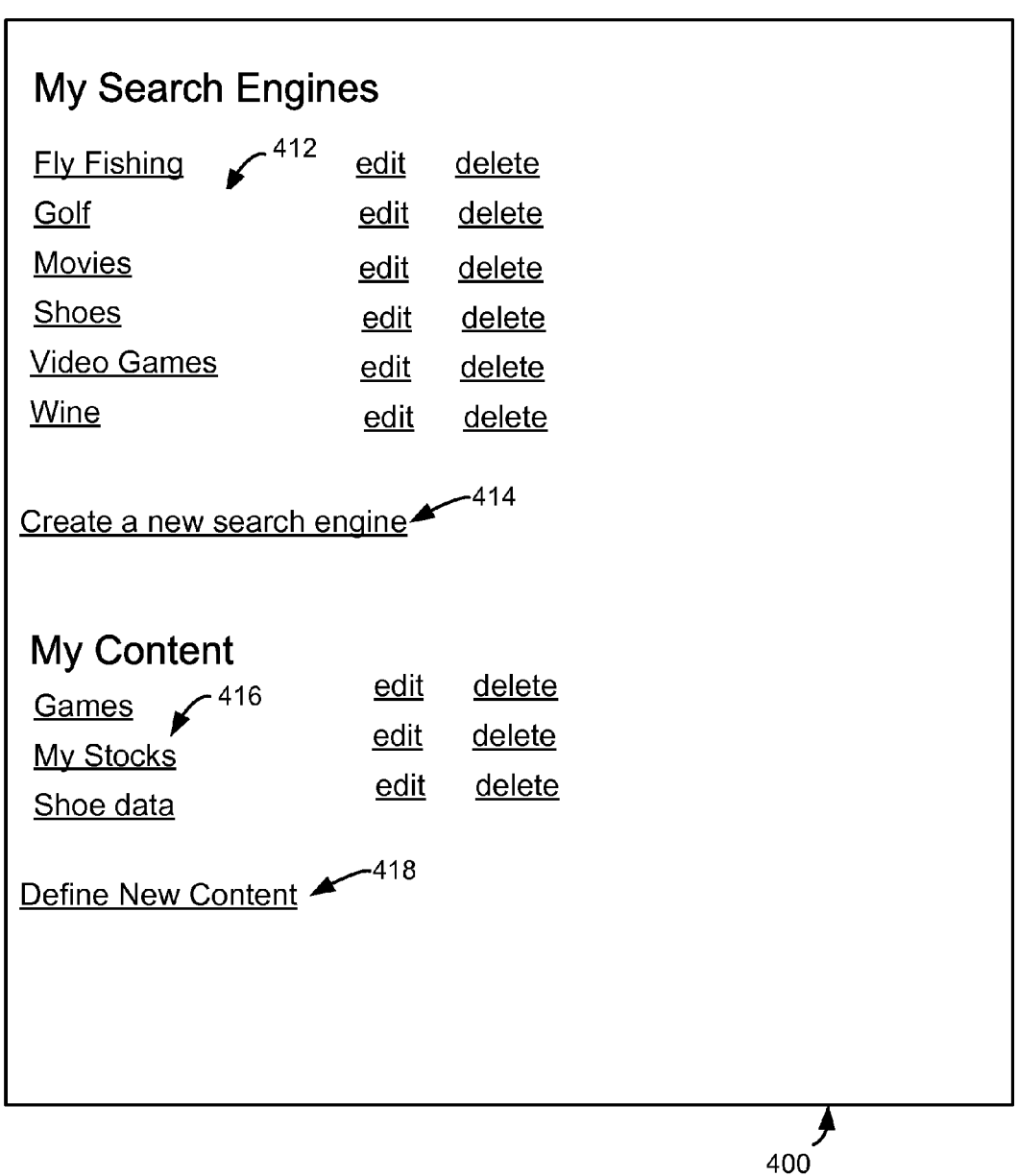
FIG. 4 shows one embodiment of a main web page for a designer that has created several custom search engines.

FIG. 4 shows one embodiment of a main web page 400 for a designer that has created several custom search engines. In one implementation, server 110 makes web page 400 available. The web page 400 has links to each of the custom search engines 412. The designer can access their custom search engines by following one of the links 412. The designer can choose to edit or delete any of the custom search engines or to create a new custom search engines. If the designer selects the create new search engine link 414, a web page such as the one depicted in FIG. 7B is accessed to allow the designer to configure a search engine. The web page 400 also has links to content 416 that the designer has supplied for use by the custom search engines. The web page also has a "define new content" link 418 that allows the designer to define new content. If the designer selects link 418, then a web page such as the one depicted in FIG. 7A is accessed. Note that other interfaces for configuring search engines and providing content are contemplated than the interfaces in FIGS. 7A and 7B. In some embodiments, the designer shares their custom search engines by, for example, placing them on the server 110.

Figure 5:
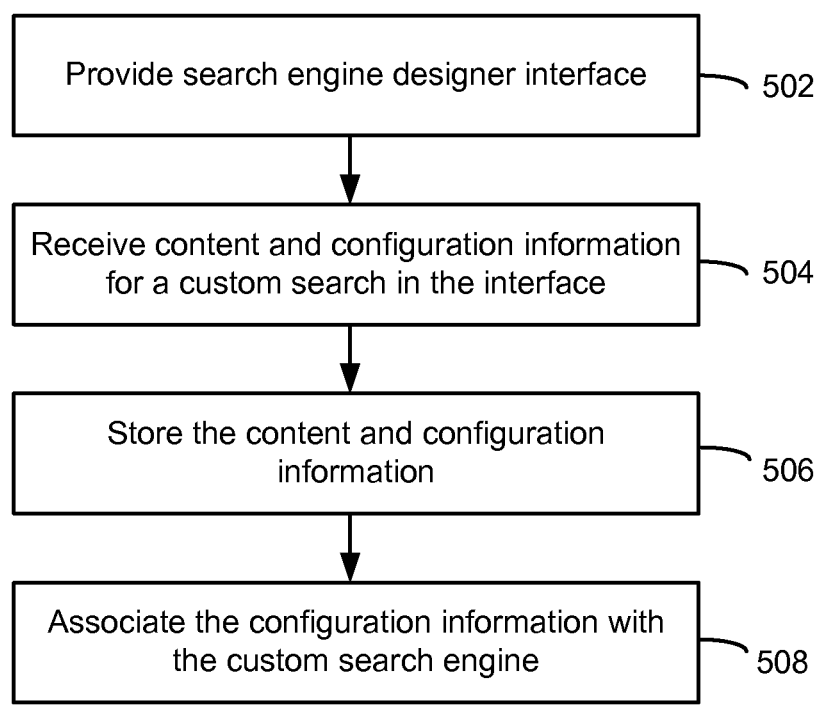
FIG. 5 is a flowchart of one embodiment of a process of constructing a custom search engine.

FIG. 5 is a flowchart of one embodiment of a process 500 of constructing a custom search engine. Process 500 may be implemented by executing instructions, which are stored on a computer storage medium, on a processor. In one embodiment, the server 110 performs process 500. The steps are described in a particular order as a matter of convenience. Note that the steps can be performed in a different order.

In step 502, an interface to create a custom search engine is provided. FIGS. 7A and 7B depict one embodiment of such an interface. FIGS. 8A-8E depict another embodiment of an interface to create a custom search engine that uses a "drag and drop" approach.

In step 504, content and configuration information for the custom search engine are received in the interface. The discussion of process 600 of FIG. 6 below provides further details of one embodiment of receiving the content and the configuration information.

In step 506, the content and configuration information for the custom search engine is stored. For example, server 110 stores designer content provided by the designer in the initial content 140. The server 110 might alternatively store an identifier for the content such as a URL. Note that the identifier of the content might be stored elsewhere, such as in the configuration data 122. The server 110 stores the configuration information for the custom search engine in the configuration data 112.

In step 508, the configuration information is associated with the custom search engine such that the configuration information can be retrieved when a search is performed using the custom search engine. Thus, the configuration information can later be identified when the JavaScript associated with the search results page 104 sends metadata that identifies the custom search engine.

Figure 6:
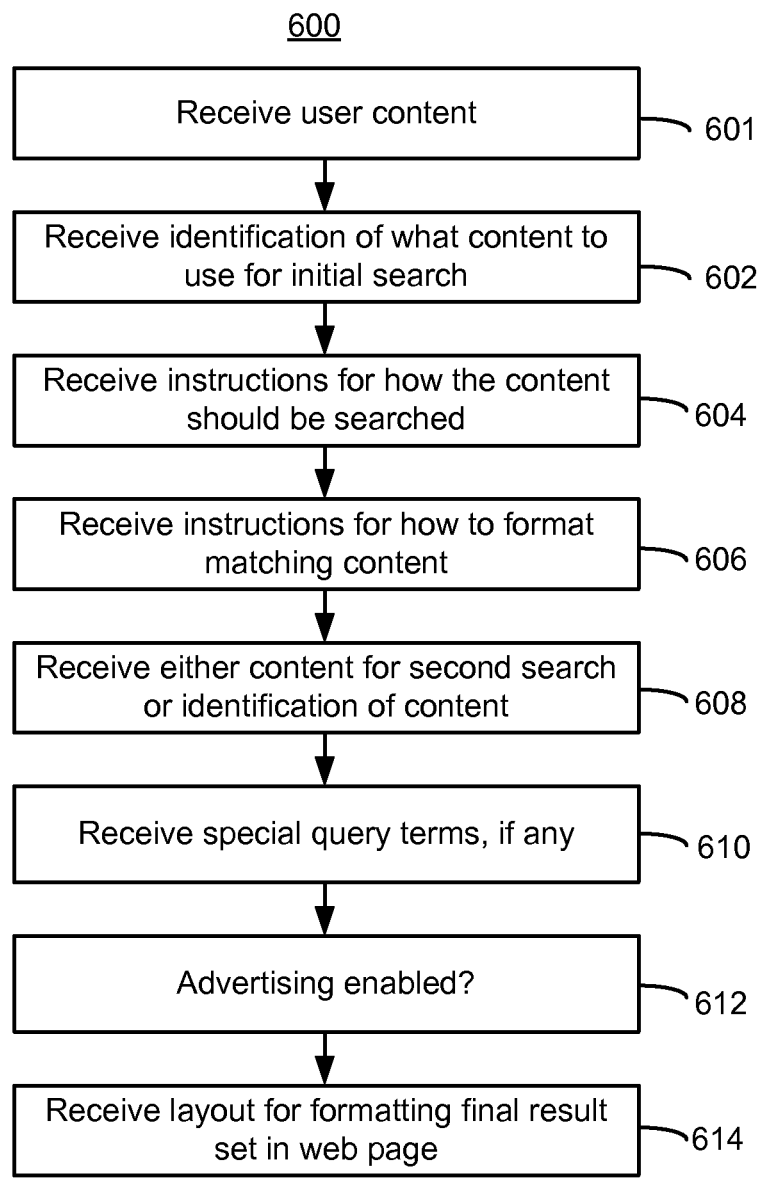
FIG. 6 is a flowchart depicting one embodiment of a process of receiving content and configuration information in an interface for designing a custom search engine.

FIG. 6 is a flowchart depicting one embodiment of a process 600 of receiving content and configuration information in an interface for designing a custom search engine. Process 600 may be implemented by executing instructions, which are stored on a computer storage medium, on a processor. In one embodiment, the server 110 performs process 600. Process 600 is one technique for implementing step 504 of process 500.

In step 601, designer content is uploaded to (or alternatively registered with) the server 110. The content can be uploaded to the server 100 (or other server) in a variety of different techniques such as an HTTP file upload using a web browser, RSS feeds. The content could have a variety of data formats including, but not limited to, delimited files, Excel files and XML. Rather that providing the content itself, the designer may simply identify the content. For example, the designer could supply root URLs. In this case, the server 110 performs a crawl of web sites associated with the root URLs and generates an index. Note that the URLs supplied by the designer need not be otherwise discoverable by an ordinary server crawler. Also, if those URLS are blocked (e.g., by a robots.txt file), then the designer may need to authorize the server crawler by adding it to the list of allowed crawlers.

FIG. 7A is one embodiment of a configuration tool 700 that allows the designer to upload or register their content with the server 110. In one implementation, server 110 makes configuration tool 700 available for designers through a web page. This configuration tool 700 can be used in step 601 of process 600. In this example, the designer is configuring a search engine named "Video Games." Specifically, the designer is configuring details of content to be searched when using the custom search engine. The designer has entered a short description of the content in the description box 702. In this embodiment, the designer is allowed to specify a "root or feed" URL in box 704 to identify the content to be searched. If the designer specifies a root URL, the server 110 will crawl the web site of the URL to obtain the content. If the designer specifies a feed URL, the server 110 pulls the file from the URL. The designer is allowed to browse their computer system and directly upload a file by entering a file path name into box 706. The designer can also cut and paste content such as an XML file into the inline text box 708. For example, the designer can enter XML content about video games into the text box 708. This content might be could represent a designer's wish-list, their personal collection of video games, inventory of a video-game store, etc. Thus, the content may represent the designer's proprietary data and may have some structure such as name, description, price, ticker symbol, etc.

In step 602, the content to be used for the initial search is identified by the designer. FIG. 7B is one embodiment of a configuration tool 750 for providing configuration information. In one implementation, server 110 makes configuration tool 750 available for designers through a web page. In FIG. 7B, the designer is configuring the same search engine "video games" that the designer uploaded content for in the interface of FIG. 7A. The user has entered a description of the custom search engine in box 703. This configuration tool 750 can be used to identify the content for the initial search. Specifically, if the designer selects the arrowhead 760, a drop down menu appears below content box 754, allowing the designer to select what content of theirs should be used. Specifically, this menu contains a list of the content under the "my content" heading of the web page of FIG. 4. In this case, the designer has selected the "games" content. Fields 756-760 of this configuration tool 750 will be discussed later in process 600.

In step 604, instructions for how the content identified in step 602 should be searched is received. In one aspect, the default is that any text-based fields will be used for free-text search, and numeric fields will be used for parametric search. The designer may refine which fields of the content are to be used, and in the case of parametric search, what similar words could be used to refer to a given field. For example, to support both the queries "8 megapixel digital camera" and "8MP digital camera", the designer might indicate that the "megapixels" field in the data can be referred to by users as "megapixel" or "MP". However, note that the server 110 may already have a large variety of synonyms built-in. Thus, the designer-provided synonyms serves as a backstop. Some attributes such as "price" will also need to be explicitly identified to support queries of the form "digital camera around $400".

In step 606, the designer specifies how content that matches the search query should be formatted. For example, the designer specifies which fields from the content should be presented as part of each search result. As a specific example, the designer specifies that the title field should be included in the search results. In one embodiment, the designer specifies the layout of the results page. For example, the designer specifies exactly where the movie title, movie description, and movie trailer should appear.

In step 608, the designer identifies additional content to be searched. In one implementation, the designer is allowed to select from a variety of services ranging from web-results, news, image, video, instant answers, etc. Note that the service is in effect tailored for the custom search engine by selection of the sub-queries (e.g. product name) and how many results to show. Also note that a selected portion of the service might be searched rather than the entire service. For example, web-search could be customized to restrict or prefer certain sites. In one aspect, advanced query operators such as "prefer:" and "location:" are used. A service that provides "instant answers" could be customized to allow only desired answers, such as the "weather instant answers" in a vacation-package custom search engine or a "product sentiment answer" in a custom search engine related to product shopping. Referring again to the configuration tool 750 of FIG. 7B, the designer may specify one or more URLs in the URL box 756 to identify the additional content. This embodiment also has a "suggest URL" button 762, which triggers a function that suggests URLs to the designer.

In step 610, the designer provides any special query terms. Referring again to FIG. 7B, the query term box 758 allows the designer to specify special query terms. In one aspect, the query terms are used to influence the ranking of the search results. For example, search results that have the query term receive a boost in the ranking. In another aspect, the query terms are used to augment the sub-queries.

In step 612, the designer indicates whether or not they wish to have advertisements on the results page. If advertising is enabled, the designer may automatically benefit from advertisement revenue sharing. In some embodiments, the designer can customize what terms are used to trigger advertisements. In some embodiments, the designer can customize what types of advertisements and advertisers should be allowed. Referring again to FIG. 7B, the interface has an "advertising" check box 760 for the designer to select.

In step 614, the designer specifies the layout of the final search results 132. FIGS. 8A-8D depicts configuration tools that allow a designer to configure a search engine and identify content to be searched using a drag and drop approach. The drag and drop approach provides a very convenient easy way for the designer to arrange the layout of the search results page 104. In one embodiment, the designer is allowed to select from a set of pre-defined templates for the layout of the search results 132.

Figure 8A:
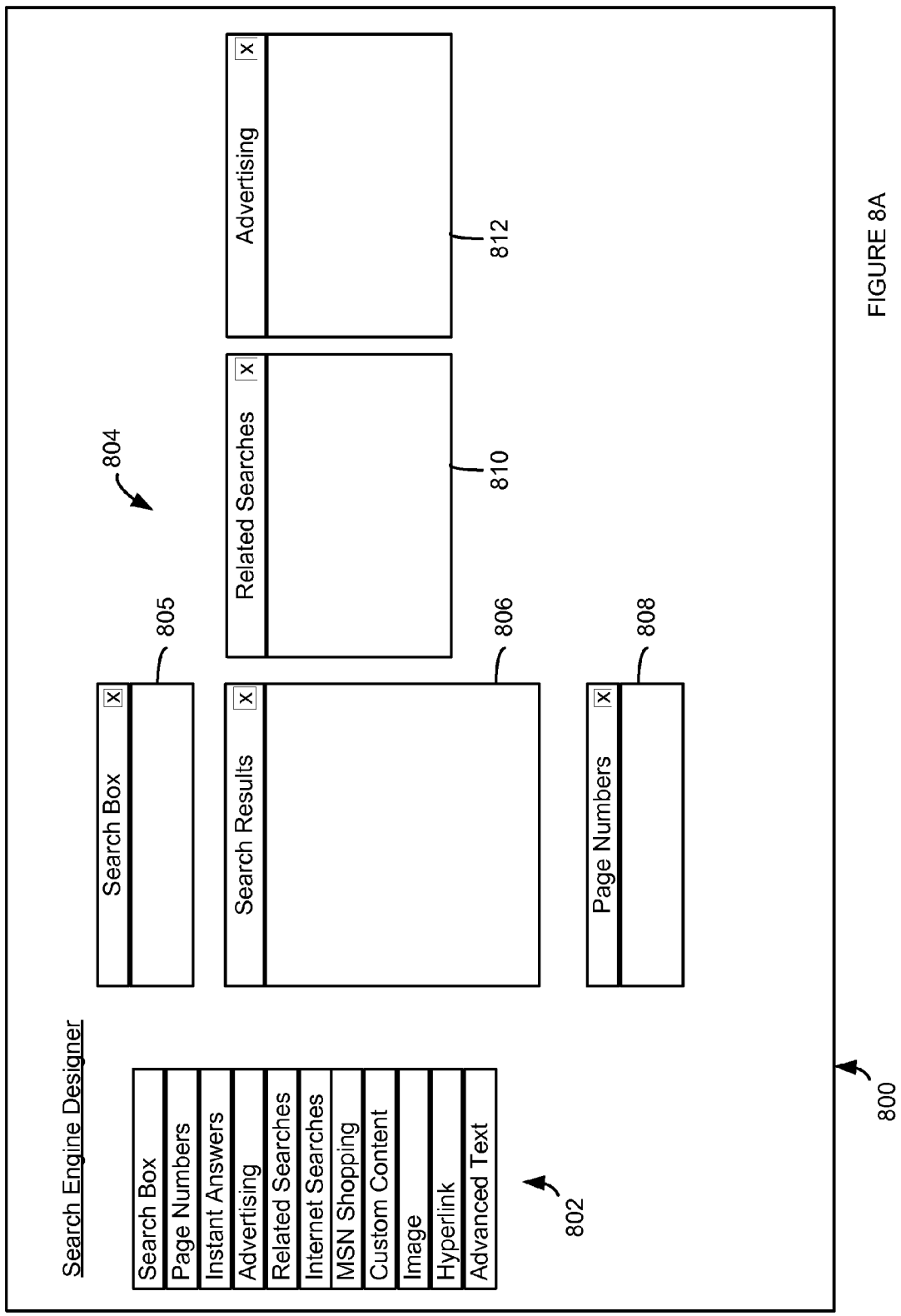
FIG. 8A depicts one embodiment of a drag and drop interface for creating a custom search engine.

FIG. 8A depicts one embodiment of a search engine drag and drop configuration tool 800 for creating a custom search engine. In one implementation, server 110 makes configuration tool 800 available to designers through a web page. Designers are shown a palette 802 of available content on the left side and the current layout 804 of the custom search application on the right. More specifically, the layout 804 drives how the search results page 104 will appear. Designers can drag content from the palette 802 and drop it onto their application layout 804. This could be Internet content such as Web, News, Image results, custom/proprietary content registered with the server 110, advertisements, content from built-in services such as MSN Shopping, etc. Configuration tool 800 also lets the designers configure items such as where the search box 805 should go on the results page 104 and page numbers 808 (for jumping to the next page of search results).

Many of components that designers drag onto the layout 804 can be configured, such as how many search results to show and what specific content should be searched. Many components in the layout 804 can have their own sub-layout specified. For example, the layout of the search results 806 can be configured by the configuration tool 840 of FIG. 8C. Thus, the designer can configure how the various items in the search results should be rendered on the search results page 104 (e.g. image thumbnail first, then title with hyperlink, then description, etc.).

FIG. 8B shows one embodiment of a configuration tool 820 for customizations related to the content that is to be searched first by the custom search engine. In one implementation, server 110 makes configuration tool 820 available to designers through a web page. In this example, the designer specifies what content to search first by selecting the arrowhead 760 to cause a drop down menu to be displayed (drop down menu not depicted). The designer has selected the games content, which appears in the content box 826. By entering the value 10 in the number of results box 822, the designer has specified that 10 search result items from the game content are to be returned in the final search results 132. The designer may also configure additional query terms by entering them into the query augmentation box 824. In one aspect, the query augmentation is used to add a search term to the initial query entered in search box 106. In another aspect, the query augmentation is used to influence rankings of the initial results by boosting the ranking of results that include the term in the query augmentation.

Figure 8C:
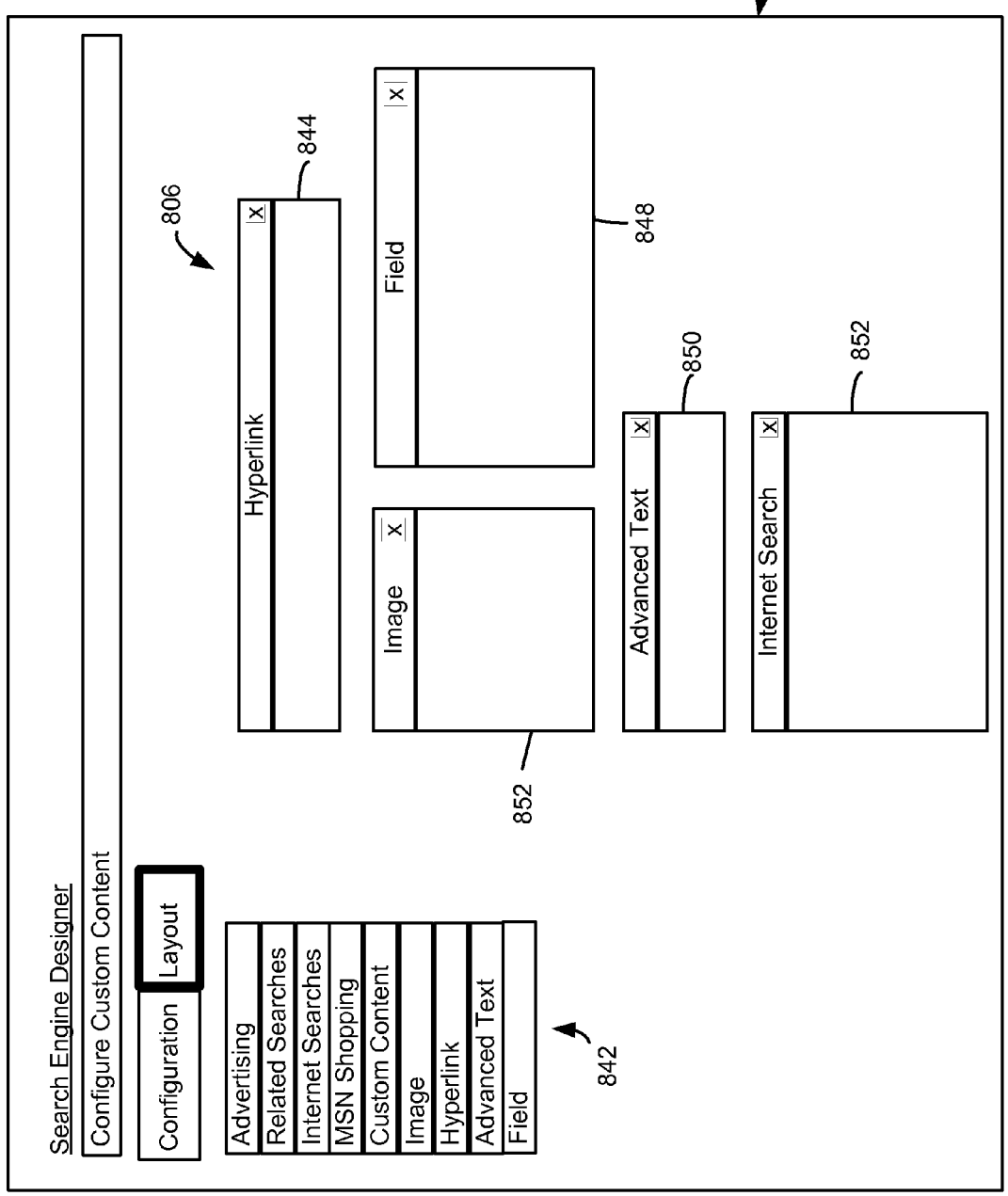
FIG. 8C depicts one embodiment of a configuration tool that allows a designer to customize how the content is laid out in the search results page.

FIG. 8C depicts one embodiment of a layout configuration tool 840 that allows a designer to customize how the final search results 132 are arranged. In one implementation, server 110 makes layout configuration tool 840 available to the designer through a web page. This configuration tool 840 allows the designer to configure the layout of the results for the "search results" 806 component of FIG. 8A. The layout configuration tool 840 of FIG. 8C is similar to the main configuration tool 800 of FIG. 8A in that the designer can drag and drop various components from the left palette 842 onto the search results layout 806.

Note that the search results layout 806 is reflected in the arrangement of FIG. 2. In the example, the designer has placed a hyperlink 844 on top. The hyperlink component 844 may in turn be configured to use Title and URL fields from the games structured content. The designer has placed image component 852 below the hyperlink component 844. This image component may be configured to use a thumbnail-url field in the games structured content. The general field component 848 is for showing the raw description field from the games content. The designer can enter their own text in the advanced text component 850. For example, the "review" text in FIG. 2 can be generated from the advanced text box 850. The designer has dragged and dropped an "Internet Search" component 852 near the bottom. This will cause the additional search results to be displayed in that location. Note that this entire layout 806 is used to render a single result. For example, in FIG. 2 the layout corresponds to result items 204a, 206a, 208a, 210, and 212a. Because the custom content was configured to show up to 10 results, this layout will be repeated up to 10 times (possibly on different result pages).

Figure 8D:
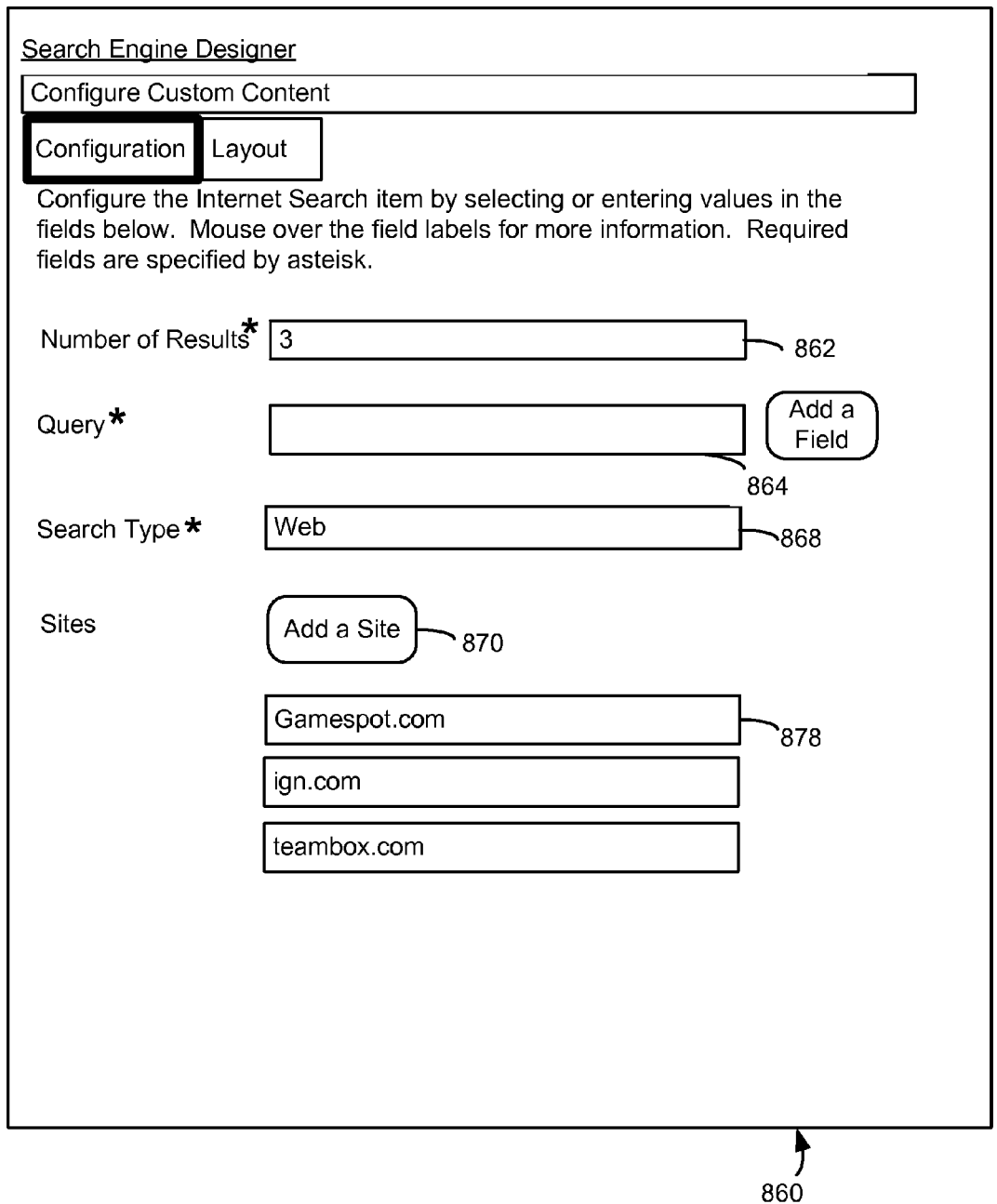
FIG. 8D is one embodiment of an interface to configure the "Internet Search" component from the "engine drag-n-drop" page from FIG. 8C.

FIG. 8D is one embodiment of a configuration tool 860 to configure the "Internet Search" component 852 from the "search result drag-n-drop" tool 840 from FIG. 8C. In one implementation, server 110 makes configuration tool 860 available to the designer through a web page. Note that this tool 860 is used to configure the additional search that is based on the sub-queries. The designer is allowed to specify how many additional search results to show by entering a value in box 862. The configuration tool 860 also shows that the designer has indicated that for each result in the initial results 122, web content from the three sites should be shown. In this example, those are gamespot.com, ign.com and teamxbox.com. This corresponds to having three links 212a to reviews in FIG. 2.

The designer is allowed to specify what type of content to search in box 868. In this example, the designer has selected a web search. The designer is allowed to restrict the search to specified sites by clicking on the "add a site" button 870, which will bring up a URL box 878 for the designer to enter a URL. The page 860 also lets the designer specify any additional query terms for the search of the additional content 150 in box 864. In one aspect the additional query terms are used to influence the ranking of the search results. In another aspect, the additional query terms are used to augment one or more of the sub-queries.

Note that in this example, a first component (the search result component 806) "contains" a second component (the Internet search component 852). Anytime a component ("child") is added to the layout of another component, fields from the containing component can be used to drive the search in the child component. Thus, if the Internet search component 852 were to contain a child component, then fields from the Internet search component 852 could be used to drive a search of content associated with the child component. As an example, the first component could relate to a search of designer content for movies, the second component could relate to a search for movie reviews (the sub-queries are based on the movie titles), and the third component could relate to a search for evaluations of the movie reviews (the sub-queries are based on the movie reviewers). The result page could appear similar to that of FIG. 2 with the augmentation of stars next to each movie review link 212 to indicate the evaluation of the movie reviewer.

Figure 9A:
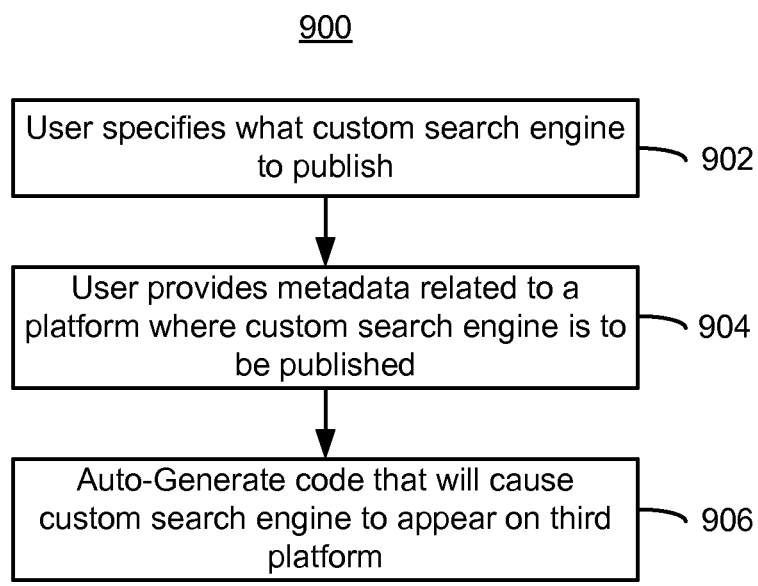
FIG. 9A is flowchart illustrating one embodiment of providing code to a designer to help publish a custom search engine.
Figure 10:
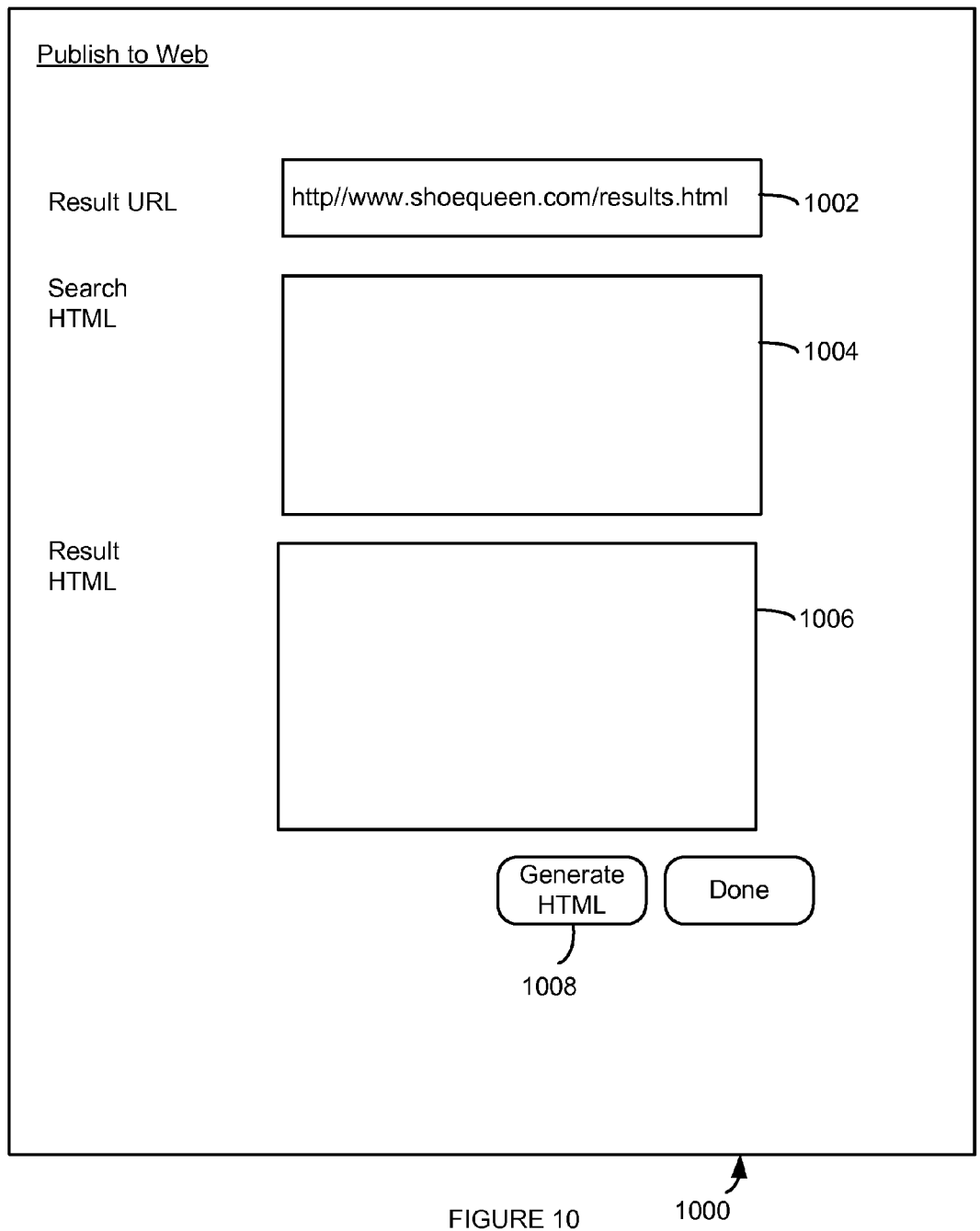
FIG. 10 is a one embodiment of an interface for providing code to a designer to help the designer publish a custom search engine.

FIG. 9A is flowchart illustrating one embodiment of a process 900 for providing code to a designer to help the designer publish a custom search engine. Process 900 may be implemented by executing instructions, which are stored on a computer storage medium, on a processor. In one embodiment, the server 110 performs process 900. In one embodiment, the interface of FIG. 10 is used in process 900; however, process 900 is not limited to that interface. In step 902, the designer identifies the custom search engine that is to be published. As an example, the server 110 provides the designer with an interface that allows the user to input the name of the custom search engine. The user might select the name from a list of custom search engines (such as depicted in FIG. 4) or enter the name in a text box.

In step 904, the user provides some metadata that is related to the platform in which the custom search engine is to be published. The platform may be the designers's own web site or a third party platform. For example, the designer may wish to publish their custom search engine to a social networking web site. The metadata may include, but is not limited to, a URL and an application identifier. FIG. 10 depicts one embodiment of an interface 1000 to enter the metadata. However, a different interface can be used.

In step 906, code is generated that allows the custom search engine to be published to the specified platform. For example, the code is capable of creating a placeholder in the search results page 104 for the final search results 132. The code may also be capable of communicating the initial search query to the server 110. Further, the code may be able to obtain the final search results 132 from the server 110. Portions of this code may be HTML, JavaScript, or FBML (Facebook Markup Language), but is not so limited.

Figure 9B:
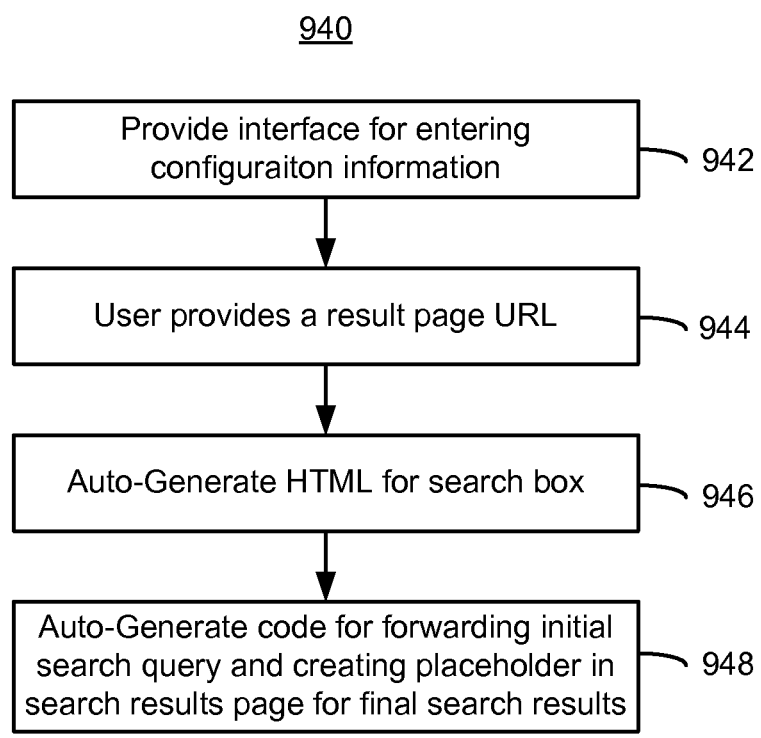
FIG. 9B is flowchart illustrating one embodiment of providing code to a designer to help the designer embed a custom search engine on their web site.

FIG. 9B is flowchart illustrating one embodiment of a process 940 for providing code to a designer to help the designer add an entry point to a custom search engine to their web site. Process 940 is one technique of publishing a custom search engine as described in FIG. 9A. Process 940 may be implemented by executing instructions, which are stored on a computer storage medium, on a processor. In one embodiment, the server 110 performs process 940. In step 942, an interface that allows a designer to specify how to embed their custom search engine into their own website is provided. FIG. 10 depicts one embodiment of an interface 1000 to enter the information. In one implementation, server 110 makes interface 1000 available to the designer through a web page.

In step 944, the designer specifies a search results URL in the result URL box 1002. Step 944 is one technique for implementing step 904 of process 900. The designer then clicks the generate HTML button 1008, which causes the server 110 to automatically generated code, in step 946. The code (e.g., HTML) is used to create a search box 106. The HTML is customized to expose the search engine the designer just created and consists of static HTML for the search box 106. In FIG. 10, the server 110 provides HTML in text box 1004 next to the "search HTML". This "Search HTML" snippet can be used to render a simple search box 106 anywhere on the target website. If a query is entered by a user into the provided search box 106, the user will be taken to the results page 104. That is, the results page 104 is loaded in the client browser on the user's computer.

In step 948, additional code is generated. The additional code may include JavaScript that is able to automatically forward the initial search query to the server 110. The additional code may also be used to create a placeholder in the search results page 104 where the search results 132 will be displayed. This code generation step also occurs in response to the user clicking the create HTML button 1008, although a different button could be used. The text box 1006 next to the Result HTML is where the server 110 provides a code snippet that the designer may embed in the search results page 104. This snippet is capable of assisting in the rendering of the framework for the search results page 104 that is loaded in the client after the user submits the initial query and prior to the final search results 132 being received, as well as forwarding the initial search query to the server 110. Steps 946 and 948 are one technique for implementing step 906 of process 900.

The technology herein may be described in the general context of computer-executable instructions, such as program modules, being executed by a computer. Generally, program modules include routines, programs, objects, components, data structures and so forth that perform particular tasks or implement particular abstract data types. The technology herein may also be practiced in distributed computing environments where tasks are performed by remote processing devices that are linked through a communications network. In a distributed computing environment, program modules may be located in both local and remote computer storage media including memory storage devices.

The technology described herein is operational with numerous other general purpose or special purpose computing system environments or configurations. Examples of well known computing systems, environments, and/or configurations that may be suitable for use with the technology herein include, but are not limited to, personal computers, server computers, hand-held or laptop devices, mobile phones or devices, multiprocessor systems, microprocessor-based systems, set top boxes, programmable consumer electronics, network PCs, minicomputers, mainframe computers, distributed computing environments that include any of the above systems or devices, and the like.

Figure 11:
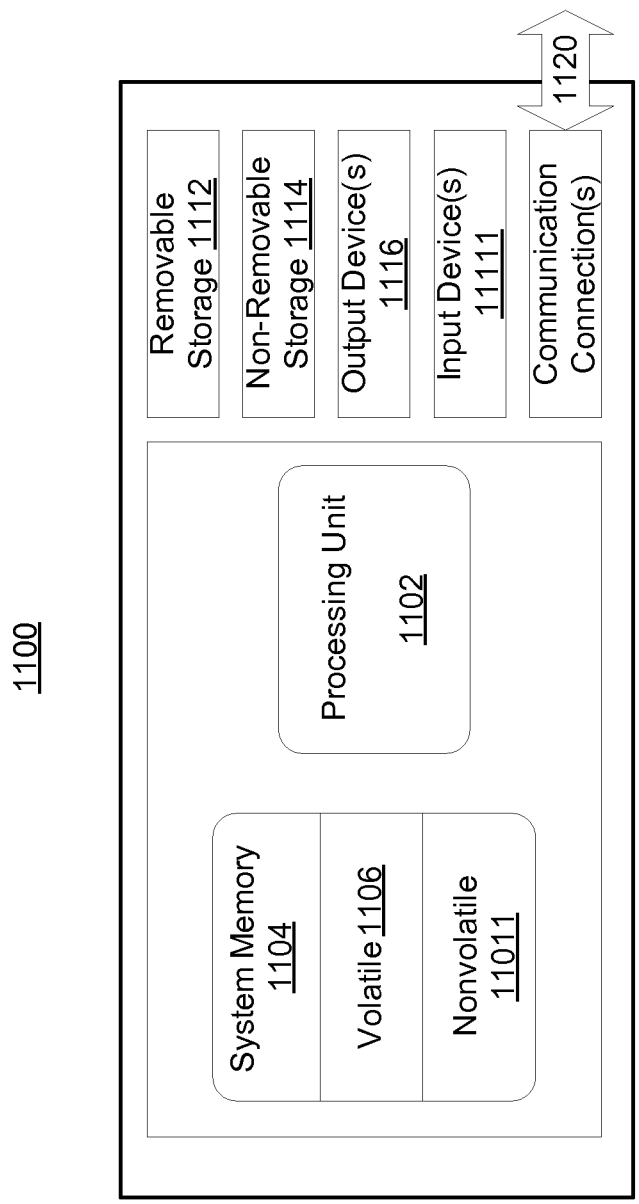
FIG. 11 is a block diagram for an embodiment of a computing environment for implementing the present technology.

FIG. 11 depicts an example computer system 1100 that may serve as a platform for embodiments of the present invention. The server 110 may be implemented with such a computer platform. In its most basic configuration, the computer 1100 typically includes a processing unit 1102 and memory 1104. Depending on the exact configuration and type of computing device, memory 1104 may be volatile (such as RAM), non-volatile (such as ROM, flash memory, etc.) or some combination of the two. Additionally, computer 1100 may also have mass storage (removable 1112 and/or non-removable 1114) such as magnetic or optical disks or tape. Similarly, computer 1100 may also have input devices 1117 such as user input device (FIG. 1, 104) and/or output devices 1116 such as output device (FIG. 1, 190). Other aspects of device 1100 may include communication connections 1120 to other devices, computers, networks, servers, etc. using either wired or wireless media.

In one embodiment, to implement processes described herein computer readable instructions that are stored on computer readable media are executed on a processor. Computer 1100 may include a variety of computer readable media. Computer readable media can be any available media that can be accessed by computer 1100 and includes both volatile and nonvolatile media, removable and non-removable media. By way of example, and not limitation, computer readable media may comprise computer storage media and communication media. Computer storage media includes volatile and non-volatile, as well as removable and non-removable media implemented in any method or technology for storage of information such as computer readable instructions, data structures, program modules or other data. Computer storage media includes, but is not limited to, random access memory (RAM), read only memory (ROM), EEPROM, flash memory or other memory technology, CD-ROMs, digital versatile discs (DVDs) or other optical disc storage, magnetic cassettes, magnetic tapes, magnetic disc storage or other magnetic storage devices, or any other storage medium which can be used to store the desired information and which can be accessed by computer 910. Communication media typically embodies computer readable instructions, data structures, program modules or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as radio frequency and other wireless media. Combinations of any of the above are also included within the scope of computer readable media.

It is to be appreciated and understood that the exemplary system of FIG. 1 constitutes but one exemplary operating environment. Accordingly, this description is not intended to limit application of the claimed subject matter to just this one type of operating environment. Rather, the principles described herein can be implemented in other similar or different environments without departing from the spirit and scope of the claimed subject matter.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

We claim:

1. A machine implemented method comprising the steps of:
   receiving information at a first electronic device from a requestor electronic device;
   determining first results from a first corpus based on the information, the first results include a plurality of items;
   receiving an identification from the requestor electronic device that identifies a particular custom search engine having rules;
   generating sub-queries for respective ones of the items based on the respective items, the generating sub-queries is based on the rules for the particular custom search engine;
   determining a second corpus to search, the determining the second corpus is based on configuration information for the custom search engine;
   searching the second corpus using the sub-queries to obtain second results that match the sub-queries;
   generating a search result set from the first results and the second results, the generating a search result set is based on the rules for the particular custom search engine, the generating a search result set includes augmenting respective ones of the items in the first results with a portion of the second results obtained by the sub-query for the respective item; and
   providing the search result set from the first electronic device to the requestor electronic device.

2. A machine implemented method as recited in claim 1, wherein the information received at the first electronic device includes an initial search query, the determining first results from the first corpus based on the information includes obtaining initial search results that match the initial search query.

3. A machine implemented method as recited in claim 2, further comprising determining content to search using the initial search query, the first results are obtained from searching the first corpus, the determining the content is based on the rules.

4. A machine implemented method as recited in claim 1, wherein the information received at the first electronic device pertains to a user, the determining first results from the first corpus based on the information includes determining results that pertains to the user.

5. A machine implemented method as recited in claim 1, wherein the receiving an identification from the requestor electronic device that identifies a particular custom search engine includes receiving metadata from the requestor electronic device that identifies the particular custom search engine.

6. A machine implemented method as recited in claim 1, wherein the rules for the particular custom search engine specify a field in the items of the first results, and the generating sub-queries for respective ones of the items includes generating the a sub-query for a first item of the items based on data in the field for the first item.

7. A machine implemented method as recited in claim 1, wherein the generating a search result set includes determining which of the items from the first results to include in the search result set based on the second results.

8. A machine implemented method as recited in claim 1, further comprising:
   generating at least one sub-query based on the second results, the generating at least one sub-query based on the second results is based on the rules for the particular custom search engine;
   obtaining third results that match the at least one sub-query that is based on the second results; and
   wherein the search result set is generated from the first results, the second results, and the third results.

9. The method of claim 1, wherein the particular custom search engine has rules that specify how to form the sub-queries from the respective ones of the plurality of items, the generating the sub-queries is based on the rules for the particular custom search engine.

10. A system comprising a processor and a computer storage medium coupled to the processor, the computer storage medium having stored thereon a set of instructions, which when executed on the processor cause the processor to:
    receive a first search query from a requestor;
    receive metadata from the requestor that identifies a particular custom search engine;
    access stored configuration information for the particular custom search engine that is identified by the metadata;
    determine a first corpus to search, the determining the first corpus to search is based on the configuration information, wherein the first corpus is structured content having one or more fields;
    search the first corpus using the first search query to obtain first search results that match the first search query, the first search results include a plurality of search result items, the search result items each having data for a first field of the fields;
    determine a second corpus to search, the determining the second corpus is based on the configuration information;
    generate sub-queries for respective ones of the search result items, the generating sub-queries is based on the configuration information that identifies the first field, wherein the generating the sub-queries includes forming a sub-query for a respective one of the search result items from data in the first field for the respective search result item;
    search the second corpus using the sub-queries to obtain second search results that match the sub-queries;
    generate a search result set from the first search results and the second search results, the generating a search result set is based on the configuration information, the generating the search result set includes augmenting respective ones of the search result items from the first search results with a portion of the second search results obtained by the sub-query for the respective search result item from the first search results; and
    provide the search result set to the requestor.

11. A system as recited in claim 10, further comprising instructions that cause the processor to:
    provide an interface for a designer to design the particular custom search engine;
    receive information in the interface that defines the particular custom search engine;
    store the information received in the interface; and
    associate the information received in the interface with the particular custom search engine.

12. A system as recited in claim 10, further comprising instructions that cause the processor to:
    generate first code for constructing a search box for entering an initial search query in a client that renders the search box, the first code causes a framework for a search results page to be automatically loaded in the client;
    generate second code for forwarding the initial search query and metadata that identifies the custom search engine to a search engine that has access to the stored configuration information; and
    provide the first code and the second code.

13. A method comprising:
providing an interface for providing or identifying content for custom search engines;
receiving via the interface, for each of a plurality of custom search engines, either initial content to be searched or identification of initial content to be searched for each custom search engine;
creating an index in association with a first custom search engine of the plurality of custom search engines in response to receiving an identifier of initial content for the first custom search engine in the interface;
receiving via the interface, for each of the plurality of custom search engines, identification of additional content to be searched for each of the respective custom search engines;
receiving a search query at a first electronic device from a requestor electronic device;
receiving an identification from the requestor electronic device that identifies the first custom search engine of the plurality of custom search engines;
searching the initial content for the first custom search engine based on the search query and the index to produce initial search results that include a plurality of items;
generating sub-queries for respective ones of the items in the plurality of items in the initial search results, the generating sub-queries is based on rules for the first custom search engine, wherein the rules for the first custom search engine specify a field in each of the plurality of items in the initial search results, and the generating a sub-query includes generating the sub-queries based on information in the fields of the respective items;
obtaining additional search results that match the sub-queries, including searching the additional content for the first custom search engine;
generating a search result set from the initial search results and the additional search results, the generating a search result set is based on the rules for the first custom search engine and includes augmenting respective ones of the items in the initial search results with an additional search result obtained from the sub-query for the respective item in the initial search results; and
providing the search result set to the requestor electronic device.

14. The method of claim 13, wherein the obtaining the additional search results includes searching content associated with URLs that are specified in the rules for the first custom search engine.

15. The method of claim 13, further comprising:
storing initial content in association with the first custom search engine in response to receiving the initial content for the first custom search engine in the interface.

* * * * *